3,032,513
CATALYST PREPARATION PROCESS
Erik Tornqvist, Westfield, and Arthur W. Langer, Jr., Watchung, N.J., assignors to Esso Research and Engineering Company, a corporation of Delaware
No Drawing. Filed Oct. 10, 1958, Ser. No. 766,376
4 Claims. (Cl. 252—442)

This invention relates to the preparation of catalysts used in the low-pressure polymerization of alpha olefins. In particular, this invention relates to the partial reduction of titanium tetrachloride to crystalline titanium chloride, and to the polymerization of alpha olefins therewith.

This application is a continuation-in-part of application Serial No. 629,488, filed December 20, 1956, to A. W. Langer, Jr. and E. Tornqvist, now abandoned.

The low-pressure polymerization and copolymerization of alpha olefins with catalyst systems made up of a partially reduced heavy transition metal halide and a reducing metal-containing compound to high density, often isotactic, high molecular weight, solid, relatively linear products is now well known, see e.g. Belgian Patent 533,362, "Chemical and Engineering News," April 8, 1957, pages 12 through 16, and "Petroleum Refiner," December 1956, pages 191 through 196.

For some alpha olefins, particularly alpha olefins such as propylene that are capable of forming isotactic polymers, it has been found desirable to utilize crystalline titanium chloride cocrystallized with aluminum chloride as a catalyst component. The use of this crystalline catalyst material in admixture with organo-metallic activators results in efficient polymerization and the obtaining of products having good crystallinity properties.

Previously, crystalline titanium chloride cocrystallized with aluminum chloride has been prepared from titanium tetrachloride by a number of methods of which the following are the most important:

(1) Metal reduction with aluminum powder, titanium powder, or mixtures of aluminum and titanium powder in the absence of diluent at elevated temperatures.
(2) Reduction with metal alkyls, AlEt$_3$ in particular, in a diluent above about 100° C. under exacting conditions.
(3) Heating a mixture of titanium tetrachloride and aluminum alkyl after the formation of a brown precipitate at a temperature above about 70° C. in the presence of an inert diluent.
(4) Reduction of titanium tetrachloride with an aluminum trialkyl by carrying out the reduction in temperature graded stages in an inert diluent and with an aluminum trialkyl/TiCl$_4$ mole ratio of about 0.3/1.
(5) Hydrogen reduction of titanium tetrachloride above 650° C. in the presence of aluminum chloride vapors.

All of these methods have some disadvantages. Metal and hydrogen reductions require fairly high temperatures and expensive autoclave equipment is usually required. The metal alkyl reduction of TiCl$_4$ must be carried out under very carefully controlled conditions. In addition, the product does not usually yield polymers of very high crystallinity.

It has now surprisingly been found that a very highly active catalyst for the polymerization of alpha olefins can be prepared by the partial reduction of titanium tetrachloride with aluminum powder in substantially aromatic hydrocarbon diluents at relatively low temperatures and at about atmospheric pressure to form crystalline titanium chloride cocrystallized with aluminum chloride and activating this with an organo-metallic reducing compound. This catalyst, when used to polymerize propylene for example, gives a higher catalyst activity than any known propylene polymerization catalyst and produces an excellent grade of high crystallinity polypropylene.

The reduction of titanium tetrachloride to crystalline titanium chloride is carried out by forming a slurry of one mole of titanium tetrachloride and 0.10 to 0.35, preferably 0.20 to 0.33 mol of aluminum powder in 0.1 to 30, preferably 2 to 10 mols of diluent, and heating the slurry at a temperature in the range of 80° to 200° C., preferably 100° to 175° C., and more preferably at about the refluxing temperature of the diluent slurry at about atmospheric pressure. The crystallinity of titanium chloride has been found to be dependent on both time and temperature. Accordingly, the reduction can advantageously be carried out at temperatures above the boiling point of the aromatic hydrocarbon diluents by using slightly elevated pressures when a higher degree of crystallinity of the cocrystallized titanium chloride-aluminum chloride is desired than can be obtained within a given period of time at the atmospheric refluxing temperature of the diluent. Higher preparation temperatures will result in high degrees of crystallinity in relatively short times. In general, the more highly crystalline this catalyst component, the more useful the catalyst prepared therefrom for preparing highly stereoregular polyolefins. The reaction is carried out for a time sufficient to produce substantially complete reaction of the aluminum and substantially complete conversion of the reacted titanium tetrachloride to crystalline titanium chloride cocrystallized with aluminum chloride. The reaction time is not critical but will generally be in the range of 0.25 to 24 hours, preferably 1 to 6 hours, depending on the temperature of reaction utilized. In general, the purple modification was found to be the most desirable. At times a brown or brownish red form of titanium chloride is produced first, but on prolonged heating conversion of the red form to the more desirable purple form occurs.

Activators such as alkyl halides, mercury, and mercuric chloride can advantageously be added in small amounts to accelerate the reduction.

The powdered aluminum metal used in the process is finely divided ball-milled or atomized aluminum powder such as Alcoa Grade 123. In general, the particle size of the aluminum metal is in the range of 1–100 microns.

The diluents used for the reduction are aromatic hydrocarbons having melting points below about 10° C. Examples of suitable diluents are benzene, toluene, xylene, mesitylene, pseudocumene, ethylbenzene, cymene, tetralin, decalin, chlorobenzene, o-dichlorobenzene, orthochlorotoluene and the like. Benzene used at a pressure high enough to allow the reduction to take place above about 110° C. is particularly preferred since this diluent does not form resins during the reduction reaction. Aliphatic hydrocarbon diluents are not useful alone as diluents for the present process. However, mixtures of aromatic and aliphatic hydrocarbons can sometimes be used providing the aliphatic hydrocarbon does not decompose or react appreciably under the conditions of the reduction reaction. While the applicants, of course, are not held to any theory of why the reduction proceeds readily in aromatic hydrocarbon diluents and not in aliphatic hydrocarbon diluents alone, it is believed that aluminum chloride which is formed in the reduction as well as titanium chloride are fairly soluble in aromatic diluents and hence do not coat the surface of the aluminum metal powder. In addition, the complex formation between aromatic hydrocarbons and titanium tetrachloride may lower the activation energy of the reaction. Hence, the reduction goes to completion at relatively low temperatures.

The crystalline titanium chloride of the invention is believed to be composed predominately of $TiCl_3$ containing $AlCl_3$ cocrystallized in the lattice structure; and the reaction probably proceeds according to the equation:

$$3TiCl_4 + Al \rightarrow AlCl_3 + 3TiCl_3$$

The exact crystallographic structure of this catalyst is unknown at present but its surprisingly high polymerization activity is probably due to the cocrystallization of aluminum and titanium chlorides in such a manner that the crystal surface becomes electronically different from that of pure titanium chloride alone.

The approximate composition of the titanium chloride cocrystallized with aluminum chloride is $TiCl_3 \cdot 0.33AlCl_3$ as indicated by the stoichiometry of the reaction as well as by analytical data. However, a catalyst component conforming to the approximate structure $TiCl_3 \cdot 0.2AlCl_3$ has been found preferable under certain conditions. This composition can be obtained easily by making use of the fairly high solubility of $AlCl_3$ at higher temperatures in the aromatic diluents employed in the process of this invention. This solubility may amount to as much as several grams of $AlCl_3$ per 100 grams aromatic diluent at temperatures above about 100° C., see e.g. J. Chem. Soc., p. 1164 (1956). Thus, an appreciable quantity of $AlCl_3$ can be removed with the diluent by filtering the diluent-catalyst component mixture at the temperature used in the reduction. The relative amount of $AlCl_3$ thus removed will of course depend upon the type of diluent used, the temperature of reduction and filtration, and the concentration of catalyst component in the diluent. By properly controlling all these variables, it is possible to adjust the $AlCl_3$ content of the $TiCl_3$ preparation to any level below the composition $TiCl_3 \cdot 0.33AlCl_3$, e.g. $TiCl_3$—$0.2AlCl_3$, $TiCl_3$—$0.15AlCl_3$, etc.

In some cases a secondary extraction of the $TiCl_3$—$AlCl_3$ catalyst with additional hot diluent may be desirable or necessary in order to remove the desired amount of $AlCl_3$. However, care should be taken to avoid using more diluent during the catalyst preparation than is needed for the desired extraction since it is difficult to thereafter introduce more $AlCl_3$ into the $TiCl_3$ crystal lattice without using high temperature methods.

The crystalline titanium chloride cocrystallized with aluminum chloride in the aromatic diluent reaction mixture or in the aromatic diluent used to extract unwanted aluminum chloride is present in finely divided form. The following alternative procedures can be employed to prepare the complete catalyst therefrom; (1) the reaction mixture can be treated directly with an organo-metallic compound to activate the titanium chloride, or more preferably, (2) the titanium chloride can be isolated from the reaction mixture, such as by filtering, preferably at or close to the temperautre of the reduction, then pebble-milled or preferably ball-milled when dry to produce a highly active catalyst component, and thereafter slurried in a hydrocarbon diluent and treated with an orano-metallic compound.

When the second procedure is used, the hydrocarbon diluent that can be used to slurry the ball-milled catalyst component includes paraffinic hydrocarbons such as propane, isopentane, heptane, decane or other saturated petroleum or synthetic hydrocarbon oils, e.g. white mineral oil, naphthenes such as methyl cyclohexane or decalin, aromatics such as benzene, xylene, and the like. However, aromatic hydrocarbons are usually preferred.

A large number of organo-metallic compounds can be used to activate the cocrystallized titanium chloride. Among the most valuable are alkyl aluminum compounds, especially trialkyl aluminum compounds such as triethyl aluminum, tripropyl aluminum, triisobutyl aluminum, and the like, and dialkyl aluminum compounds such as diethyl aluminum halides, diethyl aluminum chloride in particular, dipropylhalides, diisobutyl halides, and the like. Monoalkyl aluminum compounds can also be used. Generally, in addition to trialkyl or triaryl aluminum compounds, organo aluminum compounds having one or two hydrocarbon radicals, and two or one electron attracting groups, such as halogen, alkoxy, organic nitrogen or sulfur groups, and the like can also be used. Systems of aluminum trialkyls, e.g. aluminum triethyl, with titanium chloride cocrystallized with aluminum chloride are particularly preferred and useful. The titanium chloride cocrystallized with aluminum chloride is treated in a non-oxidizing atmosphere with one or more of the above organo-metallic compounds in a mole ratio of 0.1 to 6 moles of organo-metallic compound per mole of the titanium chloride catalyst component at a temperature in the range of 25° to 135° C. The temperature is not critical although elevated temperatures which will result in decomposition of either or both of the components should of course not be used.

The polymerization of alpha olefins having from 3 to about 20 carbon atoms such as propylene, butene-1, 3-methylbutene-1, heptene-1, dodecene-1, styrene and the like, is carried out by contacting the alpha olefin used with the catalyst mixture of the invention in a hydrocarbon solvent at a temperature of 0 to 150° C., preferably 70 to 130° C. and at pressures ranging from about 0 to 150 p.s.i.g., preferably atmospheric pressure in batch or continuous operation. Alpha olefins having from 3 to 5 carbon atoms are preferred for use with the catalysts of the invention since these alpha olefins form highly isotactic polymers. The catalyst slurry is preferably diluted with additional solvent to provide a catalyst concentration for the polymerization of about 0.1 to 0.5 wt. percent, based on the weight of the solvent present. The polymer product concentration in the polymerization reaction mixture is preferably kept between about 2 and 25 wt. percent, based on the total contents present, so as to provide for easy handling of the polymerized mixture. When the desired degree of polymerization has been obtained, a $C_1$ to $C_8$ alkanol such as isopropyl alcohol or n-butyl alcohol, desirably in combination with a chelating agent such as acetylacetone or diacetyl is added to the reaction mixture to dissolve and deactivate the catalyst and to precipitate the polymer product from solution. The polymer product is then filtered and can be further washed with alcohol or an acid such as hydrochloric acid and dried, compacted, and packaged. It is important that the polymerization reaction be carried out in the absence of catalyst poisons such as water, oxygen, sulfur compounds, and the like.

The invention will be better understood from the following examples.

EXAMPLE I 135 cc. of titanium tetrachloride, 10 g. of an atomized aluminum powder, and 625 cc. of purified xylene were mixed at room temperature and heated to 138° C. for about 4 hours. The resulting slurry was filtered and the solid purple titanium chloride precipitate was washed twice with n-heptane and dried under vacuum at 100° C. The yield of titanium chloride was 198 g. which is 89.1% of the theoretical yield. Portions of the titanium chloride were then steel ball-milled for selected periods of time and each separately mixed with aluminum triethyl and xylene diluent. Sufficient aluminum triethyl was added to each portion to raise the aluminum/titanium ratio to 2.0. The polymerization of propylene was then carried out using 0.98 g. of total catalyst in 1 liter of xylene as diluent. The polymerization conditions and the results obtained are shown in Table I.

Table I

| Catalyst: | | | | | |
|---|---|---|---|---|---|
| Ball Milling Time, days | 1 | 2 | 5¾ | 6¾ | 7¾ |
| TiCl₃–0.33AlCl₃, g | 0.5 | 0.5 | 0.5 | 0.5 | 0.5 |
| AlEt₃, g | 0.48 | 0.48 | 0.48 | 0.48 | 0.48 |
| Al/Ti Mole Ratio | 2 | 2 | 2 | 2 | 2 |
| Reaction Conditions: | | | | | |
| Temperature, °C | 80 | 80 | 80 | 80 | 80 |
| Run length, hrs | 1 | 1 | 1 | 1 | 1 |
| Catalyst Conc., g./l | 0.98 | 0.98 | 0.98 | 0.98 | 0.98 |
| Results: | | | | | |
| Polymerization rate, g./g./hr | 89 | 124 | 148 | 155 | 163 |
| Polymer Properties: | | | | | |
| Tensile strength, p.s.i | 4,500 | 4,310 | 4,120 | 4,070 | 4,020 |
| Elongation, percent | 90 | 200 | 530 | 560 | 100 |
| Ash, percent | 0.039 | 0.028 | 0.079 | 0.040 | 0.010 |

It will be noted from the above table that in all runs polypropylene of high crystallinity and good physical properties was obtained at very high rates.

EXAMPLE II

Several preparations (A through H) of reduced titanium chloride were made by reducing TiCl₄ with aluminum powder in four different diluents. In all preparations, 189.7 g. of TiCl₄ (1 mole), 9 g. (0.33 mole) of aluminum powder (air atomized or both air atomized and then ball-milled in an inert atmosphere) and 500 ml. of diluent were mixed at room temperature in a 2-liter round bottom flask equipped with a stirrer and reflux condenser. The mixtures were heated in a nitrogen atmosphere and under good stirring to the boiling points of the respective diluents used and then allowed to reflux until complete reaction had taken place and the desired reduced titanium chloride had been obtained. The solid reduced material was then recovered by filtration, thoroughly washed with dry n-heptane and finally dried in vacuo at about 50° C. Detailed data and results from the various reduction reactions are given in Table II.

It can be seen from Table II that for all preparations yields in excess of 81% and in some instances up to 93% were obtained, calculated on complete conversion to TiCl₃·0.33AlCl₃. The actual yields were even higher as some losses occurred during the recovery and purification procedures. The data in Table II also show that the reaction rates are dependent both upon temperature and type of aluminum powder used. The highest rate obtained, i.e. complete reaction in less than two minutes (Preparation G) took place when aluminum powder with an oxide free surface was used in chlorobenzene, the highest boiling diluent employed. The influence of time and temperature on the type of reduced titanium halide formed is also apparent from a comparison of the data in Table II. Thus a wide variety of reduced titanium halide preparations can be made in almost quantitative yields and at good rates by employing the process of this invention.

Polymerization experiments showed that the preparations of Example II were highly effective as catalyst components for the stereospecific polymerization of alpha olefins. Some data from such experiments in which propylene was the monomer used are given in Table III. The polymerization procedure was essentially the same as described in Example I the only difference being that a polymerization temperature of 75° C. was used instead of 80° C. as in Example I, and a higher catalyst concentration was used in the polymerization reaction using Preparation D.

Table III

| Catalyst: | A | D | E | G | H |
|---|---|---|---|---|---|
| TiCl₃ Preparation | | | | | |
| Reduction Diluent | Benzene | Toluene | Toluene | Chlorobenzene | Chlorobenzene |
| Ball Milling Time, days | 5 | 0 | 5 | 4 | 5 |
| Weight, g | 0.5 | 1.98 | 0.5 | 0.5 | 0.5 |
| AlEt₃, g | 0.48 | 1.91 | 0.48 | 0.48 | 0.48 |
| Reaction Conditions: | | | | | |
| Al/Ti Mole Ratio | 2 | 2 | 2 | 2 | 2 |
| Temperature, °C | 75 | 75 | 75 | 75 | 75 |
| Run Length, hrs | 1 | 1 | 1 | 2 | 1 |
| Catalyst Conc., g./l | 0.98 | 3.89 | 0.98 | 0.98 | 0.98 |
| Results: | | | | | |
| Yield, g | 77.7 | 81.5 | 85.2 | 119.3 | 69.0 |
| Waxy polymer, percent | 4.1 | 6.8 | 3.2 | 4.5 | 6.5 |
| Catalyst efficiency, g./g | 79.6 | 20.9 | 87.3 | 124 | 70.8 |
| Properties of Solid Polymer: | | | | | |
| Mol. Wt. × 10⁻³ (a) | 130 | 125 | 140 | 180 | 160 |
| Density, g./ml | 0.899 | 0.895 | 0.899 | 0.900 | 0.900 |
| Softening Point, °C | 155 | 153 | 154 | 157 | 160 |
| Melting Point, °C | 162 | 161 | 163 | 165 | 166 |
| Tensile strength, p.s.i | 4,350 | 3,600 | 4,300 | 4,350 | 4,600 |
| Elongation, percent | 60 | 60 | 50 | 40 | 350 |
| Ash, percent | 0.060 | 0.062 | 0.028 | 0.033 | 0.023 | a Calculated according to the Harris correlation for polyethylene (J. Polymer Sci. 8, 361 (1952)).

It can be seen from the densities of the polypropylene samples given in Table III that the polymerization catalysts prepared by the process of the invention form highly crystalline stereoregular polymers.

It is to be noted that the process of this invention has the following advantages over the high temperature reduction of TiCl₄ with aluminum powder in the absence

Table II

| Preparation | A | B | C | D | E | F | G | H |
|---|---|---|---|---|---|---|---|---|
| Diluent | Benzene | Benzene | Benzene | Toluene | Toluene | Toluene+ n-Decane.a | Chloro-Benzene. | Chlorobenzene. |
| Aluminum Powder, Type b | #101 | #101 | #101 | #101 | #123 | #101 | #101 | #123. |
| Reaction Conditions: | | | | | | | | |
| Temperature, °C | 82 | 82 | 82 | 112 | 112 | 115–120 | 134 | 134. |
| Activator— | | | | | | | | |
| Type | n-PrCl | None | None | None | n-PrCl | None | n-PrBr | Hg.c |
| Amount, g | 0.3 | | | | 8.9 | | 0.03 | 1. |
| Reaction time, min.— | | | | | | | | |
| Total | 15 | 25 | 1,080 | 15 | 185 | 70 | 10 | 90. |
| To complete reaction | 3 | 10 | 8 | 2 | 120 | 5 | <2 | 90. |
| Results | | | | | | | | |
| Yield, g.d | 184 | 161 | 182 | 172 | 171 | 174 | 175 | 184. |
| Color of Product | Brown | Reddish Brown. | Reddish Brown. | Brown | Purple Violet. | Purple | Reddish Brown. | Light Purple. | a Equal volumes of toluene and n-decane.
b #101 was ball-milled in an inert atmosphere; #123 was atomized in air. Both preparations were supplied by Alcoa.
c The aluminum powder was ground together with the mercury for about 2 min. in a mortar.
d The theoretical yield not accounting for losses during filtration, washing and drying, was 198 g.

of xylene, which is the process formerly preferred for the preparation of cocrystallized titanium chloride and aluminum chloride.

(1) Shorter operation times are required.
(2) The slurries of titanium chloride produced can be utilized directly upon the addition of an organometallic compound to polymerize alpha olefins.
(3) Operation at lower temperatures and at about atmospheric pressures eliminates expensive autoclave equipment.
(4) This process can easily be adapted to a continuous system if desired.

The invention is not limited to the examples which are given by way of illustration purposes only. Also modification of the process will occur to those skilled in the art without departing from the spirit and scope of the invention.

What is claimed is:

1. A process for the preparation of crystalline titanium chloride containing cocrystallized aluminum chloride comprising the steps of contacting titanium tetrachloride in a substantially aromatic hydrocarbon diluent at a temperature in the range of 80–200° C. with from 0.10 to 0.35 moles of aluminum powder per mole of titanium tetrachloride to form a reaction product and isolating said reaction product.

2. The process of claim 1 wherein from 0.20 to 0.33 mol of aluminum powder is employed per mole of titanium tetrachloride.

3. The process of claim 1 wherein the reaction is carried out at a temperature in the range of 100–175° C.

4. The process of claim 1 wherein the reaction is carried out at atmospheric pressure and at the boiling point of the aromatic hydrocarbon diluent.

References Cited in the file of this patent

UNITED STATES PATENTS

| | | |
|---|---|---|
| 2,577,591 | Sailors | Dec. 4, 1951 |
| 2,634,260 | Carnahan | Apr. 7, 1953 |
| 2,678,923 | Hansford | May 18, 1954 |
| 2,745,735 | Byrns | May 15, 1956 |
| 2,745,802 | Schmidt | May 15, 1956 |
| 2,864,749 | Slatin | Dec. 16, 1958 |
| 2,880,199 | Jezl | Mar. 31, 1959 |
| 2,925,392 | Seelbach et al. | Feb. 16, 1960 |

FOREIGN PATENTS

| | | |
|---|---|---|
| 218,210 | Australia | Nov. 3, 1958 |
| 1,132,506 | France | Nov. 6, 1956 |